(12) United States Patent  (10) Patent No.: US 7,576,955 B1
Yang et al.  (45) Date of Patent: Aug. 18, 2009

(54) DISK DRIVE ACTUATOR WITH OUTER ARMS HAVING REGIONS OF REDUCED WIDTH AND INCREASED THICKNESS

(75) Inventors: Jian Yang, Fremont, CA (US); Chen-Chi Lin, San Jose, CA (US); Yee-Chung Fu, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 505 days.

(21) Appl. No.: 11/295,418

(22) Filed: Dec. 6, 2005

(51) Int. Cl.
 *G11B 5/55* (2006.01)
 *G11B 21/08* (2006.01)

(52) U.S. Cl. .................................................. 360/266

(58) Field of Classification Search ................ 360/266, 360/265.9, 266.1, 244.8, 244.9, 245, 245.1
See application file for complete search history.

(56) References Cited

U.S. PATENT DOCUMENTS

| | | | |
|---|---|---|---|
| 5,268,805 A | | 12/1993 | Peng et al. |
| 5,299,082 A | * | 3/1994 | Ananth et al. ............ 360/265.9 |
| 5,343,345 A | | 8/1994 | Gilovich |
| 5,905,608 A | | 5/1999 | Frees et al. |
| 5,936,808 A | | 8/1999 | Huang et al. |
| 5,978,178 A | | 11/1999 | Adley |
| 6,473,272 B1 | * | 10/2002 | Resh et al. .................. 360/266 |
| 6,538,853 B1 | * | 3/2003 | Williams et al. .......... 360/265.9 |
| 6,560,852 B2 | | 5/2003 | Liem et al. |
| 6,687,094 B2 | | 2/2004 | Liu et al. |
| 6,738,229 B2 | * | 5/2004 | Williams ................... 360/266.1 |
| 6,775,106 B1 | | 8/2004 | Williams et al. |
| 6,961,218 B1 | | 11/2005 | Lin et al. |
| 2001/0040771 A1 | * | 11/2001 | Kohei et al. .............. 360/265.9 |
| 2002/0186489 A1 | | 12/2002 | Naganathan et al. |
| 2003/0103296 A1 | * | 6/2003 | Jang et al. ................. 360/265.9 |

FOREIGN PATENT DOCUMENTS

| | | |
|---|---|---|
| GB | 2 358 730 A | 8/2001 |
| WO | WO 01/73765 A1 | 10/2001 |

* cited by examiner

*Primary Examiner*—Andrea L Wellington
*Assistant Examiner*—Adam B Dravininkas
(74) *Attorney, Agent, or Firm*—Barcelo & Harrison, LLP

(57) ABSTRACT

An actuator for a disk drive is disclosed. The actuator includes a plurality of arms including an upper outer arm, a lower outer arm, and at least one inner arm. The outer arms each include a region of reduced width and also include a region of increased thickness, both such regions being located closer to a proximal supported end of the outer arm than to its distal end. Each region of increased thickness has a minimum thickness that is more than the thickness of the inner arm at an equal distance from the axis. Each region of reduced width has a minimum width that is less than the minimum width of the inner arm at an equal distance from the axis.

16 Claims, 4 Drawing Sheets

DISK DRIVE ACTUATOR WITH OUTER ARMS HAVING REGIONS OF REDUCED WIDTH AND INCREASED THICKNESS

FIELD OF THE INVENTION

The present invention relates generally to actuators used in disk drives, and in particular to an actuator with outer arms having regions of reduced width and increased thickness.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The spindle motor typically includes a rotating hub on which disks mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

During operation of the disk drive, the actuator must rotate to position the heads adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

The configuration of an actuator body and actuator arms is sometimes referred to as an "E-block" because its shape can resemble the letter E when viewed from the side. The distal end of each actuator arm supports at least one head gimbal assembly (HGA). The top and bottom outer actuator arms of the E-block typically each support one HGA while the inner actuator arms (if any) typically each support two HGAs. For this reason, less mass is typically coupled to the distal ends of the top and bottom outer actuator arms than to the distal ends of the inner actuator arms (if any). Such a difference in mass can adversely affect the dynamic performance of the actuator, for example exacerbating the so-called "scissor mode" and/or other modes of vibration, and/or introducing additional peaks in the frequency response function of the actuator. Some designers have attempted to alleviate the aforementioned difference in mass by adding mass to the distal ends of the top and bottom outer actuator arms, perhaps by thickening such distal ends. However, adding mass to the distal end of any actuator arm can be undesirable because it increases the rotational inertia of the actuator, and may also increase the deflection of the arm in response to mechanical shock events.

Thus, there is need in the art for an improved actuator configuration.

SUMMARY

An actuator for a disk drive is disclosed. The actuator includes an actuator body configured to pivot about an axis and a plurality of arms extending from the actuator body away from the axis. Each of the plurality of arms includes a proximal end connected to the actuator body and a distal end. The plurality of arms includes an upper outer arm, a lower outer arm, and at least one inner arm. The upper outer arm includes a first region of reduced width and also includes a first region of increased thickness, both such regions being located closer to the proximal end of the upper outer arm than to its distal end. The lower outer arm includes a second region of reduced width and also includes a second region of increased thickness, both such regions being located closer to the proximal end of the lower outer arm than to its distal end. Each region of increased thickness has a minimum thickness that is more than the thickness of the inner arm at an equal distance from the axis. Each region of reduced width has a minimum width that is less than the minimum width of the inner arm at an equal distance from the axis.

DESCRIPTION OF THE PREFERRED EMBODIMENTS

Figure 1:
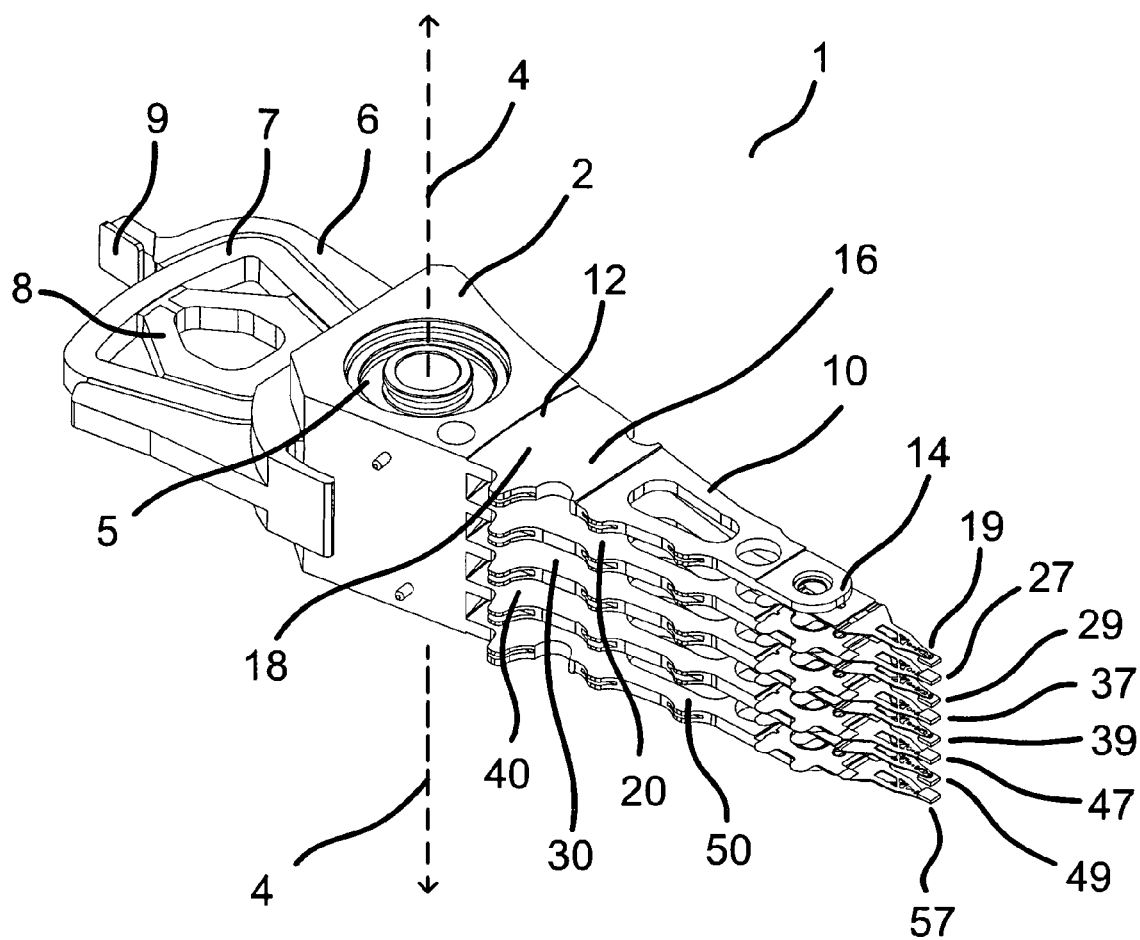
FIG. 1 is a top perspective view of a disk drive actuator according to an embodiment of the present invention.

FIG. 1 depicts a perspective view of an actuator 1 according to an embodiment of the present invention. The actuator 1 includes an actuator body 2 and actuator arms 10, 20, 30, 40, 50 that extend from the actuator body 2 away from an axis of rotation 4. The actuator body 2 is preferably fabricated from a low density metal such as aluminum, magnesium, or beryllium, or a lightweight composite material such as carbon fiber reinforced epoxy, although it is conceivable that less expensive materials such as steel or plastics might be used. The actuator body 2 and actuator arms 10, 20, 30, 40, 50 might be shaped by various conventional manufacturing methods, such as extrusion, casting, forging, coining, and machining.

Distally attached to the actuator arms 10, 20, 30, 40, 50 are head gimbal assemblies ("HGA"s) 19, 27, 29, 37, 39, 47, 49, and 57, each including a head. In the embodiment shown, HGAs 19, 29, 39, and 49 each include so-called "down heads" and HGAs 27, 37, 47, and 57 each include so-called "up heads." Note that the "up" and "down" designations are merely used as a naming or grouping convention based on the orientation of each HGA with respect to a specified direction along the axis of rotation 4, and such designations need not accord with the orientation of the HGAs with respect to gravity. It is contemplated that the number of actuator arms and suspension assemblies may vary depending upon the number of disks and disk surfaces utilized.

The actuator 1 is fashioned to pivot about axis 4 such that, during operation in a disk drive, the heads can be positioned at various radial positions relative to adjacent disk surfaces, so as to access various annular data regions of such disks. In the embodiment shown, the actuator body 2 includes a bore, and the actuator 1 further includes a pivot bearing cartridge 5 engaged within the bore for facilitating the actuator body 2 to rotate about the axis of rotation 4. The pivot bearing cartridge S may be retained within the bore by conventional means, such as by using a C-clip tolerance ring, adhesive, press-fit, etc, and is preferably retained by the means affording the greatest structural rigidity within cost constraints.

The actuator 1 further includes a coil support element 6 that extends from one side of the actuator body 2 opposite the actuator arms 10, 20, 30, 40, 50. The coil support element 6 is configured to support a coil 7 that surrounds a coil bobbin 8, and a rotation limiting tang 9. In the embodiment shown, the coil 7 is supported by adhesive bonding to the coil support element 6 and the actuator body 2. However, in other embodiments the coil 7 may be supported via the use of a plastic overmold. The coil 7 interacts with fixed magnets in the disk drive to form a voice coil motor for controllably rotating the actuator 1. After assembly within a disk drive, the actuator 1 will be in electrical communication with a printed circuit board (PCB not shown) via a flex cable assembly (not shown) that supplies electrical current to the coil 7 and carries signals between the heads and the PCB.

Figure 2:
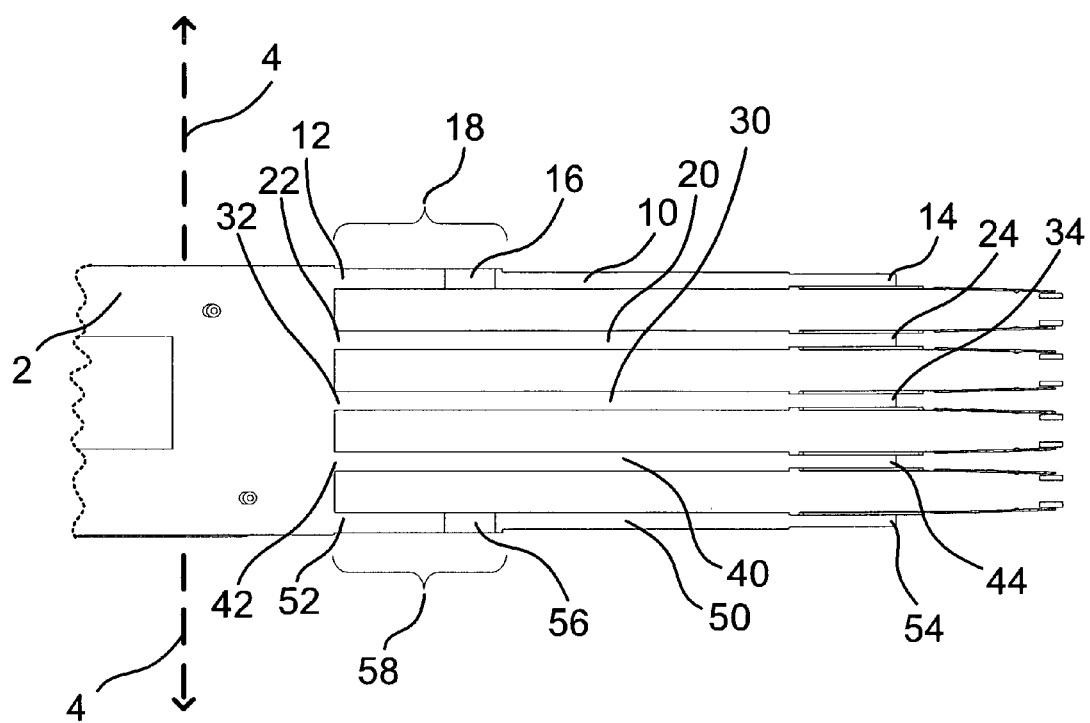
FIG. 2 is a side view of a portion of a disk drive actuator according to an embodiment of the present invention.

Now referring to the embodiment of FIGS. 1 and 2, each of the plurality of arms 10, 20, 30, 40, 50 includes a proximal end 12, 22, 32, 42, 52 connected to the actuator body 2 and a distal end 14, 24, 34, 44, 54. For the purposes of this disclosure, the length of any of the plurality of arms 10, 20, 30, 40, 50 is measured from its proximal end 12, 22, 32, 42, 52 to its distal end 14, 24, 34, 44, 54. The plurality of arms 10, 20, 30, 40, 50 includes an upper outer arm 10, a lower outer arm 50, and inner arms 20, 30, and 40.

In the embodiment shown, the top and bottom outer actuator arms 10 and 50 each support only one HGA, while inner actuator arms 20, 30, and 40 each support two HGAs. Therefore, less mass is coupled to each of the distal ends 14, 54 of the top and bottom outer actuator arms 10, 50 than is coupled to each of the distal ends 24, 34, 44 of the inner actuator arms 20, 30, 40. Moreover, in the embodiment shown, no additional mass (or thickness) is added to the distal ends 14, 54 of the top and bottom actuator arms 10, 50.

In contrast, the upper outer arm 10 includes a first region of reduced width 16 and also includes a first region of increased thickness 18, both such regions being located closer to the proximal end 12 of the upper outer arm 10 than to its distal end 14. Similarly, the lower outer arm 50 includes a second region of reduced width 56 and also includes a second region of increased thickness 58, both such regions being located closer to the proximal end 52 of the lower outer arm 50 than to its distal end 54.

In the embodiment shown, each region of increased thickness 18, 58 has a minimum thickness that is more than the thickness of any of inner arms 20, 30, 40 at an equal distance from the axis 4. In certain applications, the increased thickness can serve to increase one or more bending mode frequencies, which can improve the robustness of the disk drive to mechanical shock events. Also in the embodiment shown, each region of reduced width 16, 56 has a minimum width that is less than the minimum width of any of inner arms 20, 30, 40 at any location that is not further from the axis 4. In certain applications, the reduced width can serve to reduce the amplitude of the undesirable scissor mode of vibration.

In the embodiment of FIGS. 1 and 2, the first region of reduced width 16 is located to be co-extensive with the first region of increased thickness 18, however in certain other embodiments, the first region of reduced width 16 may be only partially co-extensive or not at all coextensive with the first region of increased thickness 18. For example, in certain other embodiments, the first region of reduced width 16 may not lie wholly within the first region of increased thickness 18, but rather the first region of increased thickness 18 may fail to extend all the way to or through the first region of reduced width 16.

In the embodiment of FIGS. 1 and 2, the second region of reduced width 56 is located to be co-extensive with the second region of increased thickness 58, however in certain other embodiments, the second region of reduced width 56 may be only partially co-extensive or not at all coextensive with the second region of increased thickness 58. For example, in certain other embodiments, the second region of reduced width 56 may not lie wholly within the second region of increased thickness 58, but rather the second region of increased thickness 58 may fail to extend all the way to or through the second region of reduced width 56.

Preferably but not necessarily, the minimum thickness of the first region of increased thickness 18 exceeds the thickness of any of the inner arms 20, 30, 40 at an equal distance from the axis 4, by 2% to 15%. For example, in an actuator 1 according to an embodiment of the present invention that is designed for use in a contemporary magnetic hard disk drive application, the minimum thickness of the first region of increased thickness 18 may exceed the thickness of an inner arm 20, 30, 40 at an equal distance from the axis 4, by 0.02 mm to 0.15 mm.

Likewise, the minimum thickness of the second region of increased thickness 58 preferably but not necessarily exceeds the thickness of any of inner arms 20, 30, 40 at an equal distance from the axis 4, by 2% to 15%. For example, in an actuator 1 according to an embodiment of the present invention that is designed for use in a contemporary magnetic hard disk drive application, the minimum thickness of the second region of increased thickness 58 may exceed the thickness of an inner arm 20, 30, 40 at an equal distance from the axis 4, by 0.02 mm to 0.15 mm.

Preferably but not necessarily, the minimum width of the first region of reduced width 16 is one half to four fifths the minimum width of an inner arm 20, 30, 40 at any location that is not further from the axis 4. For example, in an actuator 1 according to an embodiment of the present invention that is designed for use in a contemporary magnetic hard disk drive application, the minimum width of the first region of reduced width 16 may be less than the minimum width of an inner arm 20, 30, 40 at any location that is not further from the axis 4, by an amount in the range 2 mm to 4.6 mm.

Likewise, the minimum width of the second region of reduced width 56 is preferably but not necessarily one half to four fifths the minimum width of an inner arm 20, 30, 40 at any location that is not further from the axis 4. For example, in an actuator 1 according to an embodiment of the present invention that is designed for use in a contemporary magnetic hard disk drive application, the minimum width of the second region of reduced width 56 may be less than the minimum width of an inner arm 20, 30, 40 at any location that is not further from the axis 4, by an amount in the range 2 mm to 4.6 mm.

Figure 3:
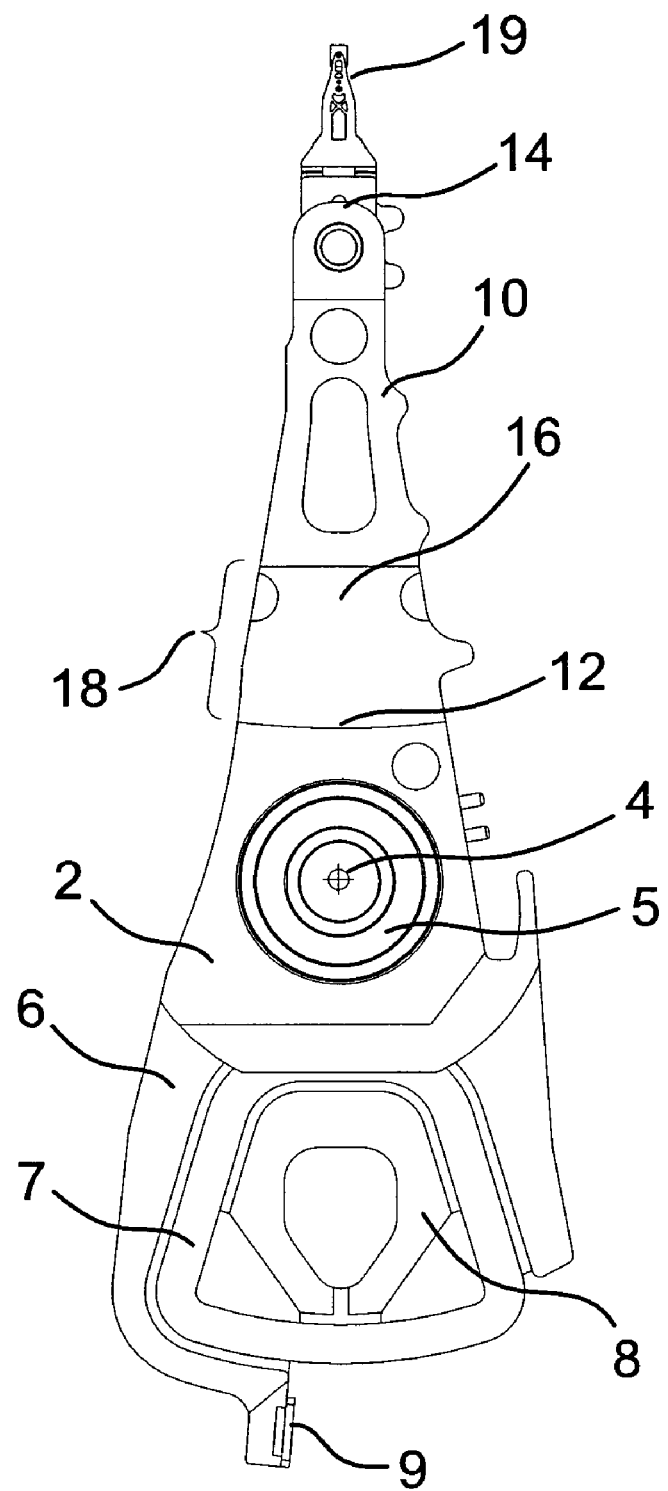
FIG. 3 is a top view of a disk drive actuator according to an embodiment of the present invention.

Now referring to FIG. 3, in the embodiment shown, the first region of increased thickness 18 is seen to extend from the proximal end 12 of the upper outer arm 10 towards its distal end 14 for a distance that is approximately two fifths of the length of the upper outer arm 10 measured from its proximal end 12 to its distal end 14. However, in certain other embodiments, the first region of increased thickness 18 extends from the proximal end 12 of the upper outer arm 10 towards its distal end 14 for a distance that is in the range of one fifth to two fifths of the length of the upper outer arm 10 measured from its proximal end 12 to its distal end 14. For example, in an actuator 1 according to an embodiment of the present invention that is designed for use in a contemporary magnetic hard disk drive application, the first region of increased thickness 18 may extend from the proximal end 12 of the upper outer arm 10 towards its distal end 14 for a distance in the range of 6 mm to 12 mm.

Likewise, the second region of increased thickness 58 preferably but not necessarily extends from the proximal end 52 of the lower outer arm 50 towards its distal end 54 for a distance in the range of one fifth to two fifths of the length of the lower outer arm 50 measured from its proximal end 52 to its distal end 54. For example, in an actuator 1 according to an embodiment of the present invention that is designed for use in a contemporary magnetic hard disk drive application, the second region of increased thickness 58 may extend from the proximal end 52 of the lower outer arm 50 towards its distal end 54 for a distance in the range of 6 mm to 12 mm.

Figure 4A:
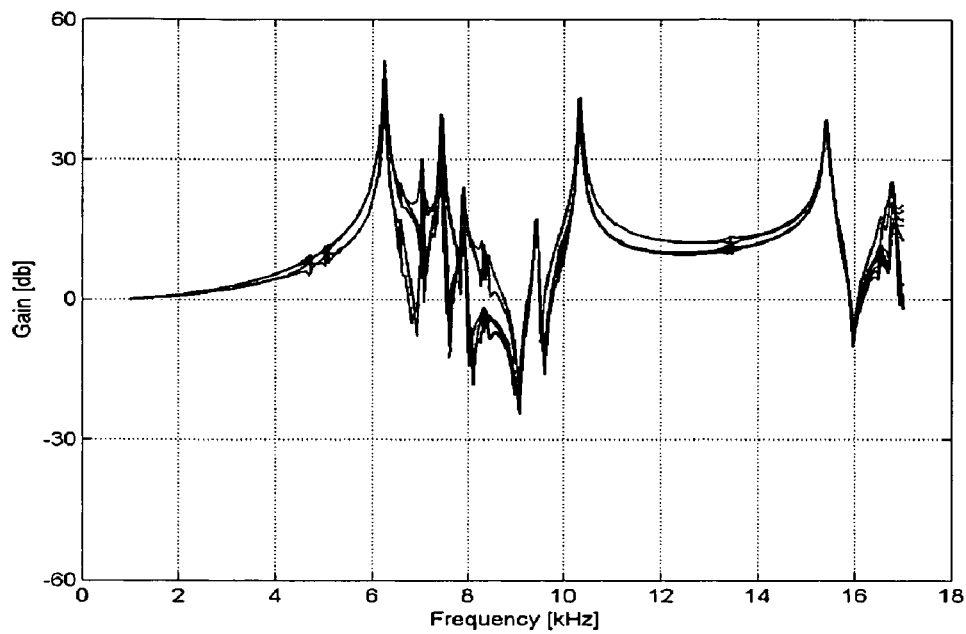
FIG. 4A is a frequency response function of a prior art actuator.
Figure 4B:
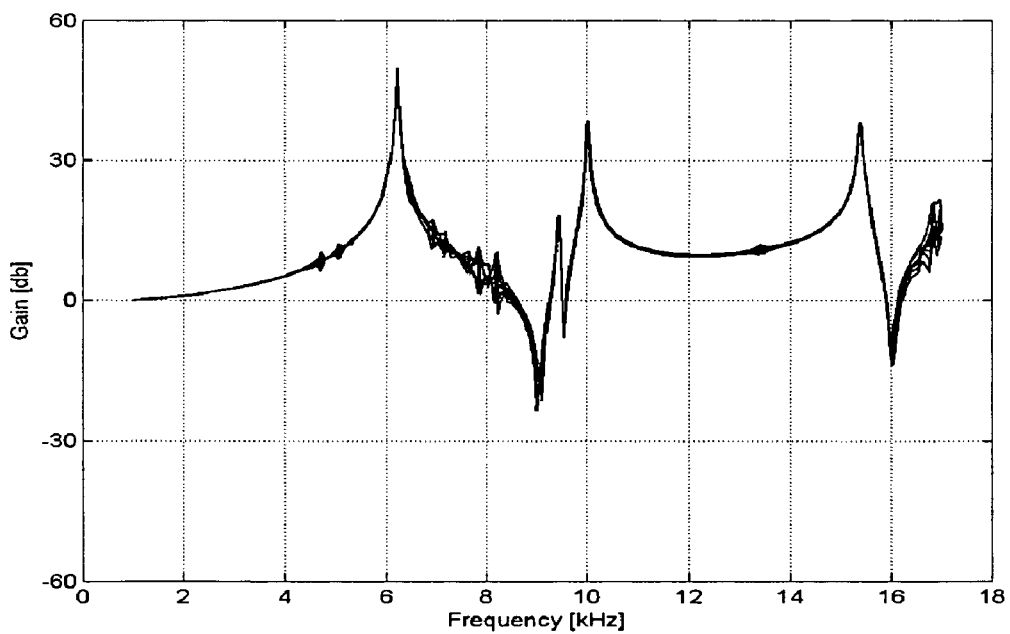
FIG. 4B is a frequency response function of an actuator according to an embodiment of the present invention.

Now referring to FIGS. 4A and 4B, there are depicted two frequency response functions for comparison. The frequency response function (FRF) of FIG. 4A illustrates the dynamic response of an actuator of the prior art, whereas the FRF of FIG. 4B illustrates the dynamic response of a similar actuator except modified according to an embodiment of the present invention. A comparison of these two FRFs reveals that the FRF of FIG. 4B is superior because it has fewer peaks and/or many of the existing peaks are of lesser gain. Additionally, some of the peaks appear at relatively shifted frequencies in the two FRFs, which may or may not be desirable depending on the specific application.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. An actuator for a disk drive, the actuator comprising:
an actuator body configured to pivot about an axis; and
a plurality of arms extending from the actuator body away from the axis, each of the plurality of arms including a proximal end connected to the actuator body and a distal end, the plurality of arms including an upper outer arm, a lower outer arm, and at least one inner arm;
wherein the upper outer arm includes a first region of reduced width and also includes a first region of increased thickness, both such regions being located closer to the proximal end of the upper outer arm than to its distal end;
wherein the lower outer arm includes a second region of reduced width and also includes a second region of increased thickness, both such regions being located closer to the proximal end of the lower outer arm than to its distal end;
wherein each region of increased thickness has a minimum thickness that is more than the thickness of the at least one inner arm at an equal distance from the axis; and
wherein each region of reduced width has a minimum width that is less than the minimum width of the at least one inner arm at an equal distance from the axis.

2. The actuator of claim 1 wherein the first region of reduced width is located to be at least partially co-extensive with the first region of increased thickness.

3. The actuator of claim 1 wherein the second region of reduced width is located to be at least partially co-extensive with the second region of increased thickness.

4. The actuator of claim 1 wherein the actuator body comprises aluminum.

5. The actuator of claim 1 wherein the minimum thickness of the first region of increased thickness exceeds the thickness of the at least one inner arm at an equal distance from the axis, by 2% to 15%.

6. The actuator of claim 1 wherein the minimum thickness of the first region of increased thickness exceeds the thickness of the at least one inner arm at an equal distance from the axis, by 0.02 mm to 0.15 mm.

7. The actuator of claim 1 wherein the minimum thickness of the second region of increased thickness exceeds the thickness of the at least one inner arm at an equal distance from the axis, by 2% to 15%.

8. The actuator of claim 1 wherein the minimum thickness of the second region of increased thickness exceeds the thickness of the at least one inner arm at an equal distance from the axis, by 0.02 mm to 0.15 mm.

9. The actuator of claim 1 wherein the minimum width of the first region of reduced width is one half to four fifths the minimum width of the at least one inner arm at an equal distance from the axis.

10. The actuator of claim 1 wherein the minimum width of the first region of reduced width is less than the minimum width of the at least one inner arm at an equal distance from the axis, by an amount in the range 2 mm to 4.6 mm.

11. The actuator of claim 1 wherein the minimum width of the second region of reduced width is one half to four fifths the minimum width of the at least one inner arm at an equal distance from the axis.

12. The actuator of claim 1 wherein the minimum width of the second region of reduced width is less than the minimum width of the at least one inner arm at an equal distance from the axis, by an amount in the range 2 mm to 4.6 mm.

13. The actuator of claim 1 wherein the first region of increased thickness extends from the proximal end of the upper outer arm towards its distal end for a distance in the range of one fifth to two fifths of the length of the upper outer arm measured from its proximal end to its distal end.

14. The actuator of claim 1 wherein the first region of increased thickness extends from the proximal end of the upper outer arm towards its distal end for a distance in the range of 6 mm to 12 mm.

15. The actuator of claim 1 wherein the second region of increased thickness extends from the proximal end of the lower outer arm towards its distal end for a distance in the range of one fifth to two fifths of the length of the lower outer arm measured from its proximal end to its distal end.

16. The actuator of claim 1 wherein the second region of increased thickness extends from the proximal end of the lower outer arm towards its distal end for a distance in the range of 6 mm to 12 mm.

* * * * *